United States Patent [19]
Rineer

[11] 3,915,147
[45] Oct. 28, 1975

[54] SOLAR ENERGY STEAM GENERATOR
[76] Inventor: Arthur E. Rineer, P.O. Box 115, Beulah, Mich. 49617
[22] Filed: Dec. 3, 1973
[21] Appl. No.: 421,048

[52] U.S. Cl. .............................................. 126/271
[51] Int. Cl.² ........................................... F24J 3/02
[58] Field of Search .......................... 126/270, 271

[56] References Cited
UNITED STATES PATENTS

| | | | |
|---|---|---|---|
| 1,989,999 | 2/1935 | Niederle | 126/271 |
| 2,030,350 | 2/1936 | Bremser | 126/271 UX |
| 2,133,649 | 10/1938 | Abbot | 126/271 |
| 2,688,922 | 9/1954 | Bonaventura | 126/270 UX |
| 3,105,486 | 10/1963 | Glenn | 126/270 |
| 3,162,189 | 12/1964 | Small et al. | 126/270 |
| 3,390,672 | 7/1968 | Snelling | 126/271 |

Primary Examiner—William F. O'Dea
Assistant Examiner—Peter D. Ferguson
Attorney, Agent, or Firm—Glenn B. Morse, Esq.

[57] ABSTRACT

Heat-absorption units are mounted at the focus of reflectors, with this relationship being altered in response to conditions in the units and in an insulated tank communicating with the units. In one form of the invention, the units purge themselves of liquid into the tank on development of temperature in the units in excess of the boiling point of liquid in the tank. Further elevation of the temperature defocuses the reflectors, and thus cools the units below the condensation point. In another form of the invention, the units communicate with the tank at vertically spaced points, and include a check valve or shut-off valve operable in response to a temperature in the units below a selected amount.

7 Claims, 7 Drawing Figures

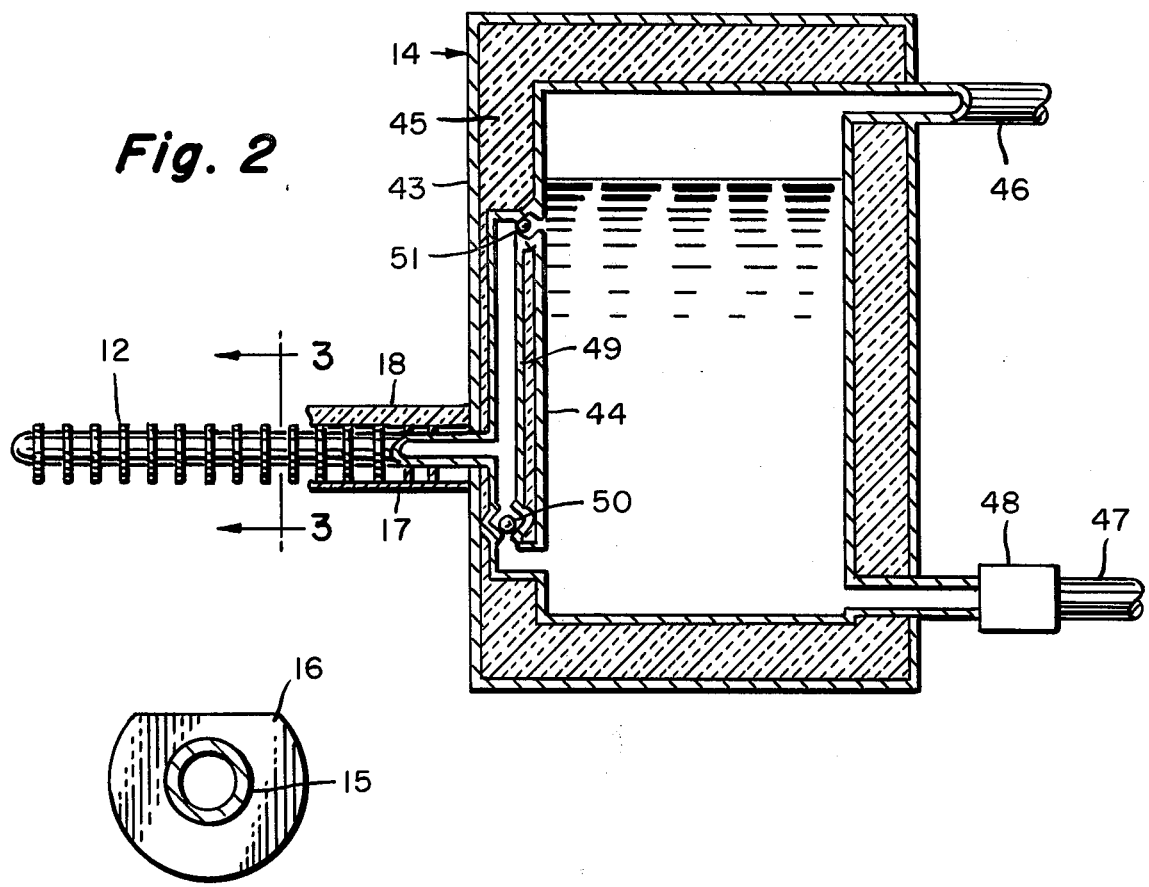
Fig. 2
Fig. 3
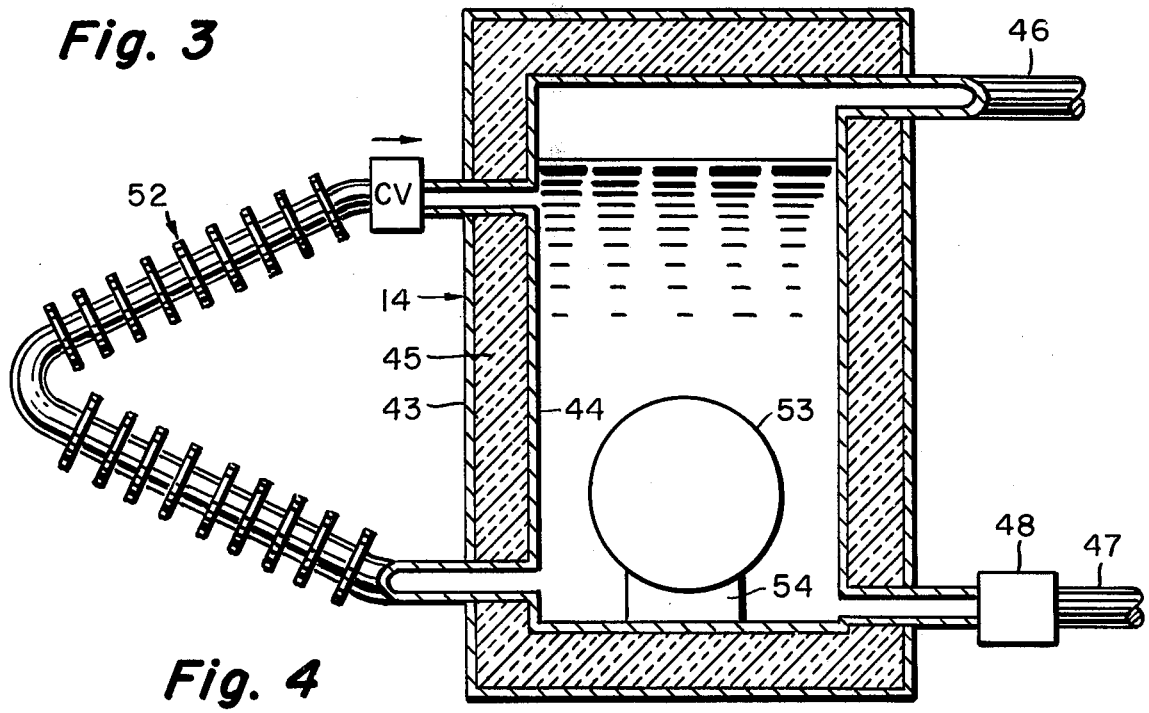
Fig. 4

U.S. Patent  Oct. 28, 1975  Sheet 3 of 3  3,915,147
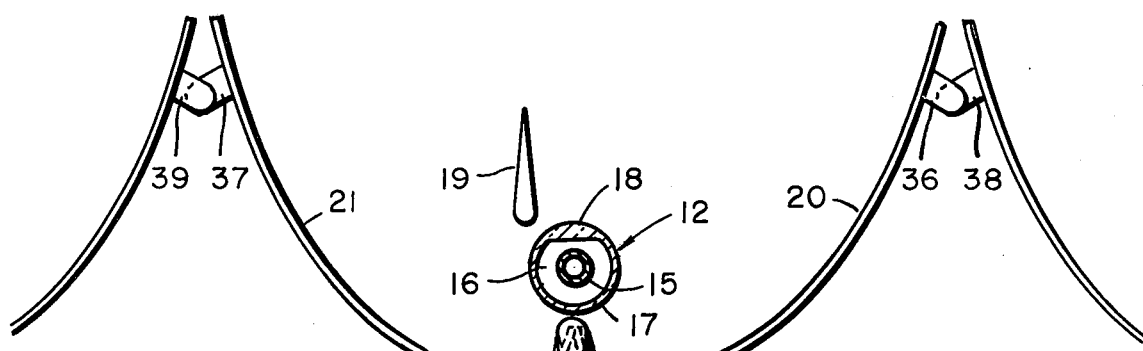
Fig. 5
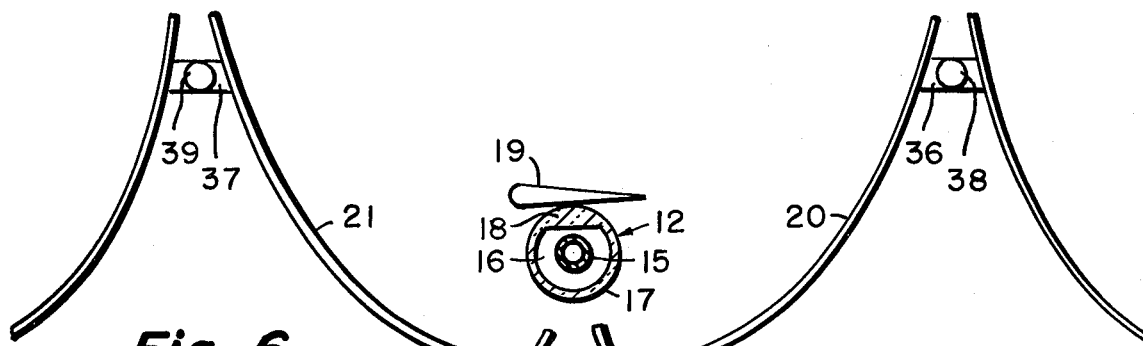
Fig. 6
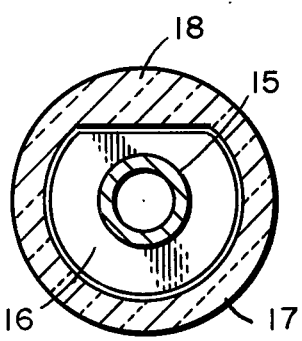
Fig. 7
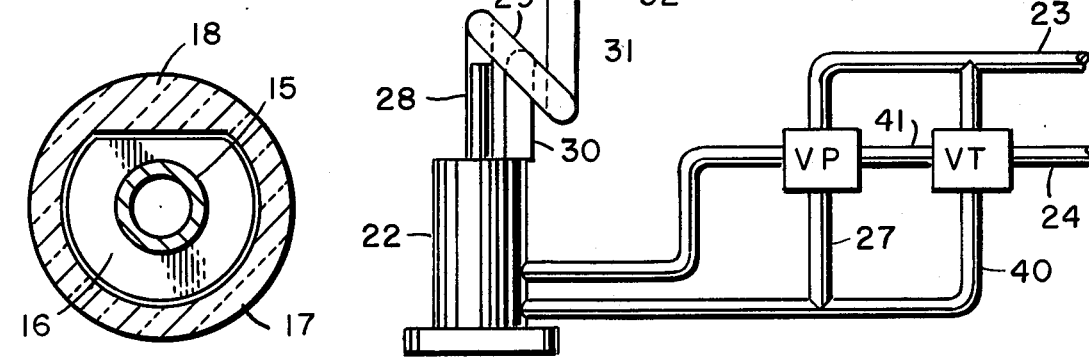

SOLAR ENERGY STEAM GENERATOR

BACKGROUND OF THE INVENTION

Solar heating systems have long been recognized as an inviting source of energy. The oldest line of development of these devices centers in a system which includes a tank of liquid, tubes communicating with the tank, and reflectors arranged to focus the sun's rays on these tubes so that they will function in a similar manner to the tubes associated with a boiler. To be at all practical, a solar energy system must be both a generator and a storage facility for energy. Extended periods of overcast conditions will necessarily reduce the output of the system to the point of dependency on it without energy storage would be precarious. One approach to the energy storage problem has been the provision of a series of batteries that can be charged during periods of productivity, and drawn upon during periods in which the generator is not sufficiently productive.

A common approach in designing these systems has been to provide a circulation within the heat-absorption tubes which may be induced either by pumps, or by the action of gravity through causing the tubes to communicate with the tank at vertically-spaced points. An increase in temperature of the liquid within the tubes provides a reduction in the specific gravity of the liquid to the point that the heated liquid is displaced upwardly, with the downflow return to be provided within the tank. It is obvious that any pumping system designed to supplement this action will necessarily draw some of the energy that the system generates.

SUMMARY OF THE INVENTION

The solar energy system provided by this invention establishes an energy storage through the use of a heavily-insulated tank to which heated liquid is delivered by the absorption tubes to maintain pressure and temperature conditions within the tank at predetermined levels. Arrangements are provided to assure that the heat-absorption system does not function in the opposite manner to cool the tank contents during overcast periods. In one form of the invention, the heat-absorption tubes below themselves free of liquid on attainment of a temperature in excess of the boiling point of the tank liquid in the tubes at the prevailing pressure, and further elevation of the temperature induces a de-focusing of the reflectors to permit the heat-absorption tubes to cool below the condensation point. This action produces a pulsing of the tank liquid into and out of the tubes, with the liquid being discharged into the tank at an elevated temperature, and preferably at an upper level within the tank. Withdrawal of liquid from the tank as the temperature in the tubes falls below a condensation point is preferably taken from the cooler lower levels in the tank. Another form of the invention utilizes a gravity-induced circulation within inclined heat-absorption tubes between vertically-spaced positions on the tank, and includes a valve blocking such circulation when the tubes would function as a cooling radiator. The control valve for this arrangement is either temperature-responsive, or a check valve sensitive enough to function in response to the reversal of flow resulting from a cooler liquid being present in the absorption tubes than in the tank.

DESCRIPTION OF THE DRAWINGS

FIG. 2 is a sectional elevation through an insulated tank associated with the heat-absorption system illustrated in FIG. 1.

FIG. 3 is a section on an enlarged scale on the plane 3—3 of FIG. 2.

FIG. 4 is a sectional elevation of a modified form of the invention from that shown in FIG. 2.

FIG. 5 is a schematic view showing the relationship of the components of the system illustrated in FIG. 1.

FIG. 6 shows the system illustrated in FIG. 5 in the de-focused condition.

FIG. 7 is a section on an enlarged scale over that of FIGS. 5 and 6, and illustrating the transparent housing for the heat-absortion tubes.

DESCRIPTION OF THE PREFERRED EMBODIMENTS

Figure 1:
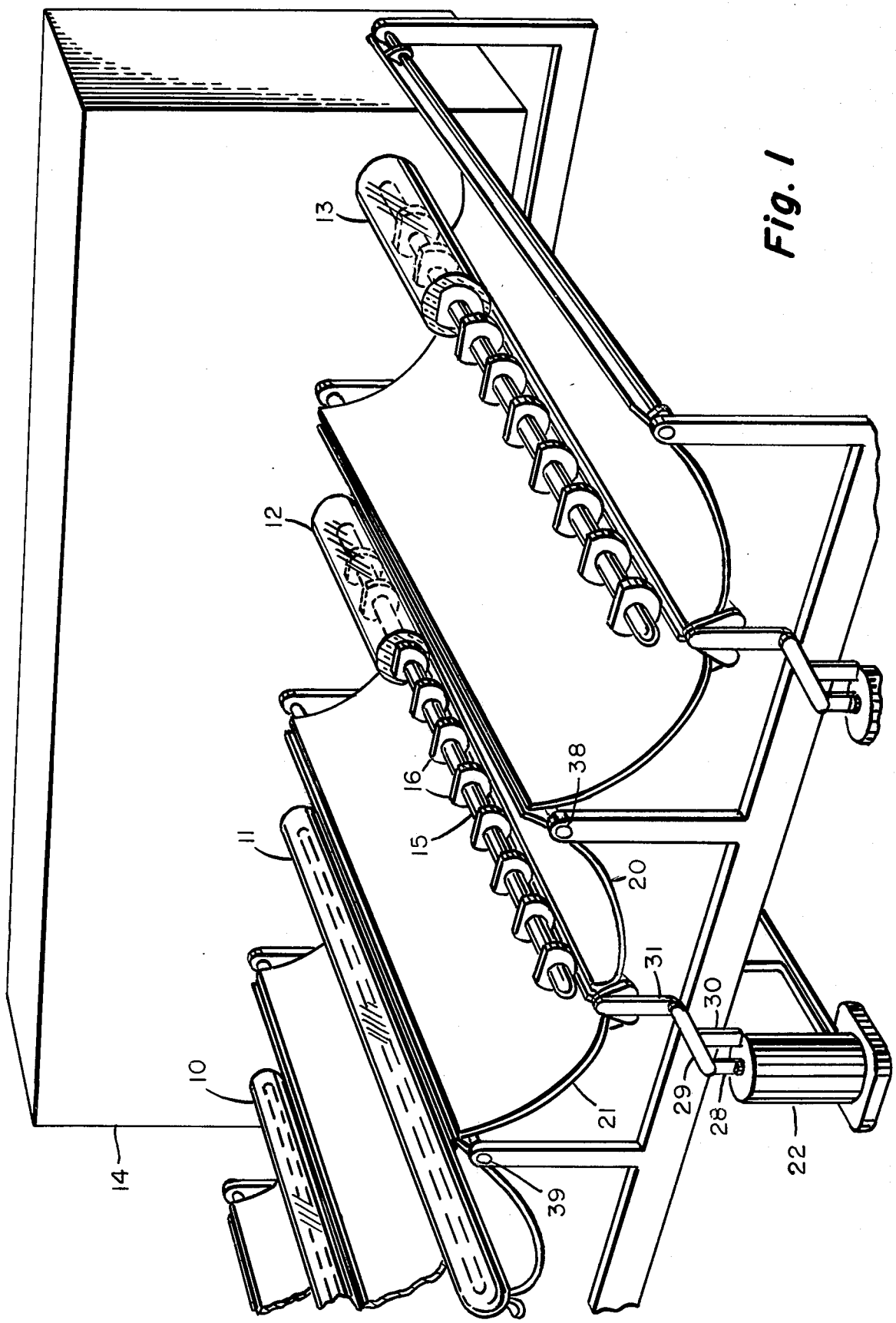
FIG. 1 is a schematic perspective view showing the components of the heat-absorption system of the invention.

Referring to the schematic illustration appearing in FIG. 1, a series of heat-absorption units is indicated at 10-13, all of these including a central absorption tube in communication with the tank generally indicated at 14. The exterior housing of this tank may be of any convenient configuration, with the liquid-containing interior container being designed to accomodate selected pressure conditions. The structure associated with each of the heat-absorption units is the same, and is best shown in FIGS. 5 and 6. The absorption units center in thin-walled tubes as shown at 15 which are preferably blackened to increase the heat conversion from the sun's rays. Suitable transverse or axial fins as shown at 16 may be provided on these tubes to further increase the heat absorption and position the tubes 15. A transparent outer housing 17 surrounds the tubes 15, with the space between the tubes and the housing preferably being evacuated. The upper portion of the tube indicated at 18 is provided with a lens-shaped configuration tending to focus the sun's rays on the upper portion of the tube 15. A flap 19 is moveable from the exposing position shown in FIG. 5 to the shading position of FIG. 6 as a means of controlling the energy transferred to the tube 15 from the sun's rays which are not focused by the semi-parabolic reflector sections 20 and 21. These are shown in the heating position in FIG. 5, and in the defocused, or cooling position, in FIG. 6. The FIG. 5 position places the focus of the parabolic segments 20 and 21 approximately at the axis of the tube 15.

Shifting of the parabolic sections from the focused position of FIG. 5 to the un-focused position of FIG. 6 is induced by the action of the piston-cylinder actuator unit 22 of conventional construction. A pressure line 23 and an exhaust line 24 communicate with the actuator 22 through either the pressure-responsive valve 25 or the temperature responsive valve 26. The actuator 22 is biased by an interior spring (not shown) to the FIG. 5 position. Attainment of excessive pressure within the tank 14 will cause the pressure-responsive valve 25 to deliver steam or air pressure through the conduit 27 to move the actuator 22 to the FIG. 6 position. The piston 28 rocks the arm 29 in a clockwise direction about its pivotal mounting on the fulcrum 30. This actions pulls downwardly on the link 31, and generates a toggle motion of the links 32 and 33 pivotally connected to the brackets 34 and 35 on the reflector sections 20 and 21. This action results in displacing the reflector sections downwardly and outwardly, thus affecting the relative position of the focus of curvature with respect to the tube 15. This movement is accompanied by a slight pivoting of the brackets 36 and 37 (secured to the reflector sections) about the shafts 38 and 39 supported by any convenient fixed structure. Alternatively, this hinging action can be replaced by simple deflection of the sheet material forming the reflector sections 20 and 21.

The pulsing action causing the flow to move to and from the tubes 15 into the tank is controlled by the temperature-responsive valve 26, which is in heat-detecting relationship with one of the tubes. On the increase in temperature in the tubes to a point above the boiling point of the liquid in the tube at the local pressure, the tube will blow itself clear of the liquid, and discharge its contents into the tank. The absence of liquid in the tube will permit the temperature to increase rapidly, and activate the valve 26. Pressure is thereby delivered through the conduit 40 to place the actuator 22 in the FIG. 6 position. The resulting defocusing of the reflectors 20 and 21 cools the tube 15 below the condensation point, thus returning the valve 26 to a position in which the actuator 22 can exhaust into the line 24 through the conduit 41. The pressure-responsive valve will normally be open to flow to the conduit 41 from the conduit 42. In summary, the un-actuated position of the pressure and temperature responsive valves is to permit the biasing action of the actuator 22 to maintain the FIG. 5 position. On the attainment of excessive pressure in the tank 14, or excessive temperature in the tubes 15, the actuator 22 will de-focus the reflector sections. This de-focusing may be supplemented by movement of the flap 19 to the FIG. 6 position where full reduction of temperature of the tubes 15 is desirable. The lens 18 should be wide enough to focus substantially all the sun rays that are not properly focused by the reflector sections. The heating effect from the lens 18 will also offset a tendency for the top of the tubes 15 to cool by radiation to the cooler housing 17.

The board aspect of the function of the valve 26 is the detection of the absence of liquid in the tubes 15. This can also be provided by detecting the deflection of the tubes. Particularly in the units 10–13 are mounted in cantilever fashion, a defection sensor of standard design can register the downward bending of the tube assemblies when full as opposed to the position when substantially free of the weight of contained liquid.

Referring to FIG. 2, the tank assembly 14 includes the outer housing 43, the inner container tank 44, and the insulation interposed between the housing and the tank shown at 45. A steam output line 46 may be associated with a piston engine or a turbine for driving an electric generator. Preferably, this arrangement will be of the closed-circuit type including a condenser which will return the condensate through the pipe 47 to the injector 48, which returns the liquid to the tank 44.

Each of the heat-absorption units preferably communicates with the tank 44 at vertically-spaced positions. The passage 49 is provided with the check valve 50 permitting exclusively outflow from the tank 44 into the heat-absorption units 12. The check valve 51 permits exclusively inflow to the tank from the heat-absorption units, thus delivering the heated liquid at the warmer portions of the tank, and withdrawing the cooler liquid from the tank during the phase of the cycle in which the absorption units are charged as the temperature falls below the condensation point.

Referring to FIG. 4, a similar tank assembly 14 is provided with the inclined heat-absorption units 52. These are preferably of a "V" configuration in side elevation in order to provide for heat transfer over the full length on exposure to the sun's rays. The upper and lower inclined sections will each be provided with reflector arrangements of the type shown in FIGS. 5 and 6, although consideration should be made with regard to the placement of the entire assembly to minimize the degree to which the upper unit will shade the lower one.

It is anticipated that the tubes 12 are most convenient in four-foot lengths, and approximately 20 of these of five/sixteenths of an inch inside diameter would be installed in conjunction with a 500 gallon tank to maintain a permanent energy delivery of three horse power at a 50% solar effect. These tubes should be thin walled, and of a highly heat-conductive material such as silver, copper, or aluminum. This arrangement would allow for long periods of overcast. If desired, the heat storage within the insulated tank can be supplemented by the storage of energy in a series of batteries, which can be charged during periods in which the demand by driven equipment was less than the generating capacity. With proper insulation, the unit appears capable of delivering 3 horse power for about 3 days without the addition of solar energy, if the normal operating cut-off pressure in the tank is approximately 100 lbs. per square inch. It is preferable to maintain the liquid in the tank at the temperature of saturated steam at this pressure. It is also possible to apply reflectors to the output of the tank to place the steam in the superheated condition. It is entirely practical to generate temperature within the tubes 12 on the order of 600 degrees Fahrenheit. To provide this temperatures capability, the reflector surface should extend laterally from the tubes over a projected area 35 times the width of the tube.

To provide the maximum degree of heat-storage capability, it may be desirable to install a heat-sink tank or container as shown at 53 in FIG. 4. This container may be filled with some liquid having a greater specific heat than that of the liquid within the container portion 44 of the tank, and may rest on appropriate abutments as shown at 54 supported by the bottom of the tank. In this arrangement, the liquid outside the heat-sink container may be selected for its vaporization characteristics exclusively. Water is usable for this function, and the heat-sink liquid can be mercury where the cost is justified. The heat-sink effects can be further increased by utilizing a material in the container 53 selected to have a melting point near the boiling point of the working liquid (at the selected pressure) used in the tubes 15. Where the latter is water, the material in the container 53 can be lithium or magnesium chloride ($MgCl_2 \cdot 6H_2O$). The heat of fusion of these materials is relatively high, and provides a very substantial energy storage. The melting point of the heat-sink material should be withing the range of temperatures encountered during the operation of the working liquid in the tank so that the release of the latent heat of fusion of the heat-sink material will maintain such temperatures. To maximize the energy storage for a given space, the quality of water may be limited to that required for the working vapor cycle, with the remainder of the available volume occupied by the heat-sink material in one or more containers 53 in heat-exchanging relationship with the water.

I claim:

1. A solar energy steam generator including tank means, heat-absorption conduit means communicating with said tank means, and reflector means operable to focus rays from the sun or said heat-absorption conduit means, wherein the improvement comprises:

de-energizing means responsive to the absence of liquid in said heat-absorption conduit means, said de-energizing means being operative to reduce impingement of sun rays on said conduit means to a degree sufficient to reduce said temperature to below the boiling point of said liquid, said de-energizing means further being operative to tend to restore said impingement in response to said reduced temperature; and a dead-ended tubular member constituting said heat-absorbing conduit means, said tubular member and de-energizing means cooperating to generate reciprocating flow of liquid in said tubular member in response to said impingement of sun rays as said liquid is blown out of said tubular member on attainment of a temperature in excess of the prevailing boiling point, and said liquid returns under vacuum as said de-energizing means operates to cyclically reduce said temperature below the condensation point.

2. A generator as defined in claim 1, wherein said conduit means communicates with said tank via an upper and a lower passage, said upper passage including a check valve permitting flow exclusively into said tank means, and said lower passage including a check valve permitting flow exclusively out of said tank means.

3. A generator as defined in claim 1, wherein said de-energizing means includes mechanism adapted to shift the relative position of said reflector means with respect to said heat-absorption conduit means primarily at a position on said reflector means adjacent the focus thereof, the outer portions of said reflector being mounted to accommodate said shift.

4. A generator as defined in claim 3, wherein said reflector is elongated along a focal axis, and includes separable substantially symmetrical components normally meeting along a line parallel to and adjacent said focal axis.

5. A generator as defined in claim 1, wherein said tube contains a lens portion disposed on the opposite side of said conduit means from said reflector means and adapted to focus sun rays on said conduit means, and wherein said conduit means has a plurality of transverse fins adapted to absorb heat resulting from impingement of sun rays, and to locate said conduit means within said tube.

6. A generator as defined in claim 5, wherein said de-energizing means includes a shade device movable to and from a position shielding said lens portion from sun rays.

7. A generator as defined in claim 1, wherein said de-energizing means includes valve means responsive to a temperature in said heat-absorption conduit means in excess of the boiling point of said liquid to reduce said temperature.

* * * * *